(12) United States Patent
Garrett et al.

(10) Patent No.: US 8,617,691 B2
(45) Date of Patent: Dec. 31, 2013

(54) STONE-EFFECT ARTICLES AND METHODS FOR MAKING SAME

(75) Inventors: Allen Garrett, Silverlake, WA (US); Jonathan King, Longview, WA (US)

(73) Assignee: SteelScape, LLC, Kalama, WA (US)

( * ) Notice: Subject to any disclaimer, the term of this patent is extended or adjusted under 35 U.S.C. 154(b) by 0 days.

(21) Appl. No.: 13/445,668

(22) Filed: Apr. 12, 2012

(65) Prior Publication Data
US 2013/0269287 A1    Oct. 17, 2013

(51) Int. Cl.
*C04B 20/12* (2006.01)

(52) U.S. Cl.
USPC .......... 428/209; 428/15; 428/195.1; 428/457; 523/171

(58) Field of Classification Search
USPC ................. 428/209, 15, 195.1, 457; 523/171
See application file for complete search history.

(56) References Cited

U.S. PATENT DOCUMENTS

| 2,248,254 | A | 7/1941 | Small |
| 2,712,174 | A | 7/1955 | Hubbell |
| 6,841,590 | B2 | 1/2005 | Modi et al. |
| 7,332,119 | B2 | 2/2008 | Riebel |
| 2002/0041937 | A1* | 4/2002 | Clemmer ........................ 428/15 |
| 2003/0150359 | A1* | 8/2003 | Lassmann ...................... 106/499 |
| 2004/0014864 | A1* | 1/2004 | Milic et al. ...................... 524/437 |
| 2004/0211141 | A1 | 10/2004 | Sandy |
| 2005/0215666 | A1* | 9/2005 | Milic et al. ...................... 523/171 |
| 2006/0270758 | A1 | 11/2006 | Ong et al. |
| 2007/0193174 | A1 | 8/2007 | Vogel et al. |
| 2007/0254144 | A1 | 11/2007 | Chen |
| 2009/0214803 | A1 | 8/2009 | Huber et al. |
| 2012/0276321 | A1* | 11/2012 | Guerra ............................ 428/68 |

FOREIGN PATENT DOCUMENTS

| FR | 2713555 A1 | 6/1995 |
| JP | 0976254 A | 3/1997 |
| WO | 9937129 A2 | 7/1999 |
| WO | 0140389 A2 | 6/2001 |

OTHER PUBLICATIONS http://www.mcelroymetal.com/elements/files/MM620option.pdf retreived Dec. 7, 2012.*
http://www.mcelroymetal.com/content/corporate/news/newsitem.cfm?newsid=102 Published: Jun. 2010.*
http://web.archive.org/web/20070710153425/http://www.mcelroymetal.com/content/products/substrates_coatings.cfm Jul. 2007.*
International Search Report and Written Opinion issued in related PCT/US2013/036455 dated Jul. 3, 2013, 13 pages.

* cited by examiner

*Primary Examiner* — Mark Ruthkosky
*Assistant Examiner* — Christopher Polley
(74) *Attorney, Agent, or Firm* — Lathrop & Gage LLP

(57) ABSTRACT

The invention relates to articles, e.g., sheet metal, comprising surface coatings that have the appearance of polished stone and methods for making such articles.

30 Claims, 2 Drawing Sheets

STONE-EFFECT ARTICLES AND METHODS FOR MAKING SAME

BACKGROUND

1. Field of the Invention

The invention relates to the application of surface coatings to substrates (e.g., metal substrates). More specifically, the invention relates to surface coatings made to have the appearance of polished stone.

2. Description of Related Art

Surface coatings that have the appearance of polished stone have many applications. For example, metal strip with a surface coating that has the appearance of polished stone is particularly useful for the manufacture of building materials (e.g, exterior cladding, interior wall panels, or ceiling panels) for the construction industry where the materials can that have the visual appearance of polished stone but have a much lower mass than that of actual stone.

Several manufactures have developed surface coating techniques that allow the production of metal strip that has the appearance of aged metal or natural stone. For example, U.S. Steel (Pittsburgh, Pa.) sell the "Weather Metal Series™" coil-coated strip metal products, which have paint coatings that resembles weathered metal. In addition, PreCoat Metals (Saint Louis, Mo.) sell the "Field Stone," "Natural Stone" and "Architecture Tile" coil-coated strip metal products, which have paint coatings that resemble unpolished stone. However, none of the surface coating techniques currently employed in the art produce a surface coating on a metal strip that has the appearance of polished stone.

Accordingly, there is a need in the art for novel surface coatings that can give articles (e.g., articles formed from metal strip) the appearance of polished stone.

SUMMARY OF THE INVENTION

In one aspect the invention provides a metal strip having a coating on at least one surface, the coating comprising a continuous paint base layer with a specular reflection between about 6 and 120 gloss units (e.g., between about 60 and 90 gloss units, or between about 80 and 90 gloss units) beneath at least one discontinuous paint layer having a stone-effect pattern, wherein the coating has the appearance of polished stone.

In certain embodiments, the continuous paint base layer comprises pigmented paint and is devoid of clear coat.

In certain embodiments, the continuous paint base layer comprises pigmented paint beneath clear coat.

In certain embodiments, the continuous paint base layer is opaque.

In certain embodiments, the coating comprises 2 to 10 discontinuous paint layers (e.g., 2, 3, 4, 5, 6, 7, 8, 9, or 10 layers). In a particular embodiment, at least 2 of the discontinuous paint layers have a different stone-effect pattern. In a particular embodiment, at least 2 of the discontinuous paint layers comprise a different paint.

In certain embodiments, at least one discontinuous paint layer comprises a pigmented paint.

In certain embodiments, at least one discontinuous paint layer comprises a color-flip paint. Suitable color-flip paints include, without limitation, polychromatic paint or paint containing mica particles.

In certain embodiments, at least one discontinuous paint layer is opaque.

In certain embodiments, at least one discontinuous paint layer comprises a clearcoat that contains mica particles.

In certain embodiments, at least one discontinuous paint layer with a specular reflection between about 6 and 120 gloss units (e.g., between about 6 and 15 gloss units, between about 6 and 10 gloss units, or between about 8 and 10 gloss units).

In certain embodiments, the continuous paint base layer and/or the at least one discontinuous paint layer comprises a polyester, acrylic, silicon modified polyester, silicon polyester, or fluorocarbon paint (e.g., PVDF and/or FEVE).

In certain embodiments, the continuous paint base layer and/or the at least one discontinuous paint layer comprises a ceramic pigment.

In certain embodiments, the coating has the appearance of polished granite.

In certain embodiments, the metal strip is steel, metallic coated steel, or aluminum. In a particular embodiment, the metal strip is coated with an aluminum, zinc, and silicon containing alloy, e.g., an alloy comprising between about 45 to about 60% aluminum, between about 37 to about 46% zinc and between about 1.2 to about 2.3% silicon by weight, optionally further comprising between about 2 to about 3% magnesium by weight.

In certain embodiments, the metal strip is a coil.

In certain embodiments, the metal is in sheet form.

In another aspect, the invention provides a cold formed product made from a stone-effect coated metal strip of the invention.

In yet another aspect, the invention provides a method for making a metal strip having the appearance of polished stone, the method generally comprising: applying a continuous paint base layer having a specular reflection of about 6 to about 120 gloss units to the metal strip; and applying onto the base layer at least one discontinuous paint layer in a stone-effect pattern.

In certain embodiments, the continuous paint base layer has a specular reflection of between about 60 and 90 gloss units (e.g., between about 80 and 90 gloss units)

In certain embodiments, the continuous paint base layer comprises pigmented paint and is devoid of clear coat.

In certain embodiments, the continuous paint base layer comprises pigmented paint beneath clear coat.

In certain embodiments, the continuous paint base layer is opaque.

In certain embodiments, 2 to 10 discontinuous paint layers are applied. In a particular embodiment, at least 2 of the discontinuous paint layers are applied in a different stone-effect pattern. In a particular embodiment, at least 2 of the discontinuous paint layers comprise a different paint.

In certain embodiments, at least one discontinuous paint layer comprises a pigmented paint.

In certain embodiments, at least one discontinuous paint layer comprises a color-flip paint. Suitable color-flip paints include, without limitation, polychromatic paint or paint containing mica particles.

In certain embodiments, at least one discontinuous paint layer is opaque.

In certain embodiments, at least one discontinuous paint layer comprises a clear coat that contains mica particles.

In certain embodiments, at least one discontinuous paint layer with a specular reflection between about 6 and 120 gloss units (e.g., between about 6 and 15 gloss units, between about 6 and 10 gloss units, or between about 8 and 10 gloss units).

In certain embodiments, the continuous paint base layer and/or the at least one discontinuous paint layer comprises a polyester, acrylic, silicon modified polyester, silicon polyester, or fluorocarbon paint (e.g., PVDF and/or FEVE).

In certain embodiments, the continuous paint base layer and/or the at least one discontinuous paint layer comprises a ceramic pigment.

In certain embodiments, the stone effect pattern is a granite-effect pattern.

In certain embodiments, the metal strip is metal, metallic coated steel, or aluminum. In a particular embodiment, the steel strip is coated with an aluminum, zinc, and silicon containing alloy, e.g., an alloy comprising between about 45 to about 60% aluminum, between about 37 to about 46% zinc and between about 1.2 to about 2.3% silicon by weight, optionally further comprising between about 2 to about 3% magnesium by weight.

In certain embodiments, the base layer and/or the at least one discontinuous paint layer are applied by flexographic printing.

In certain embodiments, the metal strip is a coil.

In certain embodiments, the metal is in sheet form.

In another aspect, the invention provides a metal strip produced by the method disclosed herein.

In a further another aspect, the invention provides a method of making a building, the method generally comprising: depositing a continuous paint base layer onto a metal strip, the paint base layer having a specular reflection between about 6 and 120 gloss units; depositing at least one discontinuous paint layer, the discontinuous paint layer having a stone-effect pattern; and installing the strip onto a building structure.

In certain embodiments, the installing step further comprises fixing the strip onto one of a purlin and a girt to at least partially enclose the building structure.

DETAILED DESCRIPTION

Figure 1:
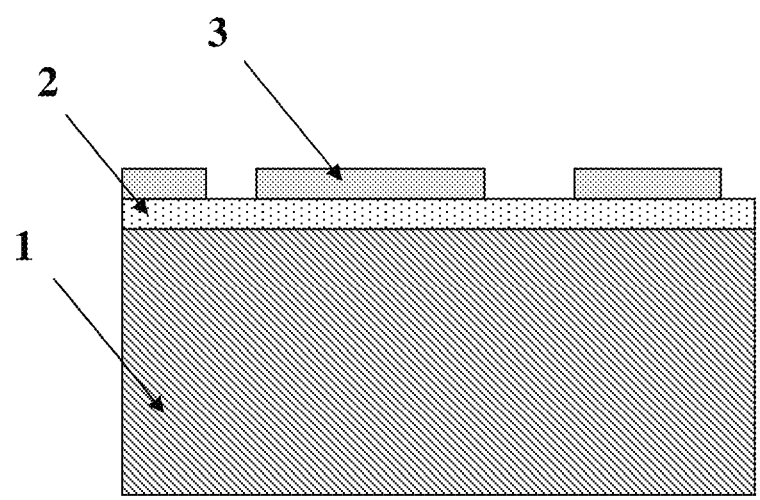
FIG. 1 depicts a cross section of an exemplary coated metal strip of the invention comprising a metal strip substrate 1, a continuous paint base layer 2, and one or more discontinuous paint layers having a stone effect pattern 3.
Figure 2:
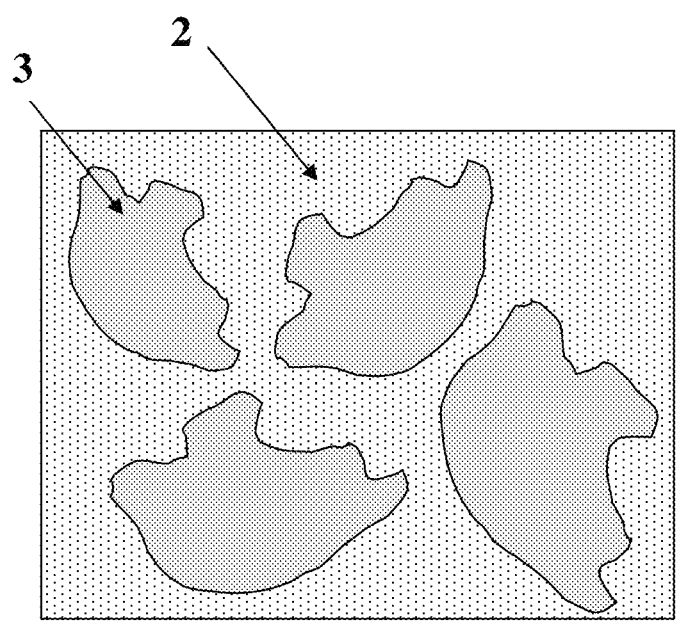
FIG. 2 depicts the obverse face of an exemplary coated metal strip of the invention comprising a continuous paint base layer 2, and one discontinuous paint layer having a stone effect pattern 3.

Disclosed are articles (e.g., metal strip) comprising surface coatings that have the appearance of polished stone and methods for making such articles. The invention is based, in part, on the unexpected discovery that the application of a surface coating comprising a gloss base layer beneath one or more discontinuous, stone-effect paint layers to a surface gives that surface the appearance of polished stone. The methods of invention are particularly advantageous in they it allow for the generation of articles that have the appearance of polished stone but have a much lower mass than that of stone. Such articles find particular utility as construction materials.

I. General Definitions

As used herein, the term "specular reflection" refers to the reflection of light from a surface at an angle of 60 degrees as measured by a glossmeter.

As used herein, the term "stone-effect pattern" refers to a design that mimics the appearance of natural or man-made stone.

As used herein, the term "color-flip paint" refers to a paint that the exhibits different colors at different viewing angles (e.g., polychromatic and/or mica containing paints).

II. Substrates

The invention provides articles having a coating on at least one surface, wherein the coating has the appearance of polished stone. The articles of the invention can comprise any substrate capable of accepting a stone-effect coating including, without limitation, metal, plastic, glass, paper and stone. The substrate can be of any size, shape or thickness.

In certain embodiments, the substrate is a strip of metal. Any metal strip can be used in the invention including, without limitation, steel, and aluminum. The metal strip can be a metal coil or sheet of any size, shape or thickness. In a particular embodiment, the metal strip is coated with a protective coating (e.g., to protect the metal strip against oxidation) prior to application of the stone-effect coating. Any protective coating can be used including, without limitation, a metallic coating. Suitable metallic coatings include, without limitation, alloy or zinc coatings. Suitable alloy coatings include, without limitation, aluminum, zinc, and silicon containing alloys (e.g., an alloy comprising between about 45 to about 60% aluminum, between about 37 to about 46 wt. % zinc and between about 1.2 to about 2.3 wt. % silicon by weight, optionally further comprising between about 2 to about 3% magnesium by weight).

III. Stone-Effect Coatings

The stone-effect coatings present on the articles of the invention (e.g., metal strip) generally comprise a continuous base layer with a specular reflection between about 6 and 120 gloss units (e.g., about, 15, 20, 25, 30, 35, 40, 45, 50, 55, 60, 65, 70, 75, 80, 85, 90, 95, 100, 105, 100, 115, or 120 gloss units). In certain embodiments, the continuous paint base layer has a specular reflection of between about 60 and 90 gloss units (e.g., between about 80 and 90 gloss units).

The continuous base layer applied to the substrate of an article of the invention (e.g., metal strip) can comprise any material capable of producing the desired specular reflection. In general, it is preferred that the continuous base layer is a paint layer. The base layer can be a single coat or multiple coats of paint. The continuous base layer can be transparent, translucent or opaque depending on the nature of the substrate and the desired properties of the base layer. Accordingly, the base layer can comprise pigmented paint and/or clear coat as required. In a particular embodiment, the continuous paint base layer comprises pigmented paint and is devoid of clear coat. In another particular embodiment, the continuous paint base layer comprises pigmented paint beneath clear coat.

The stone-effect coatings present on the articles of the invention (e.g., metal strip) generally comprise at least one discontinuous paint layer having a stone-effect pattern. In general, each discontinuous paint layer has a specular reflection between about 6 and 120 gloss units (e.g., about, 6, 7, 8, 9, 10, 12, 13, 14, 15, 20, 25, 30, 35, 40, 45, 50, 55, 60, 65, 70, 75, 80, 85, 90, 95, 100, 105, 100, 115, or 120 gloss units). In certain embodiments, the continuous paint base layer has a specular reflection of between about 6 and 15 gloss units (e.g., between about 6 and 10 gloss units, or between about 6 and 8 gloss units).

Any number of discontinuous paint layers can be employed in the stone-effect coatings of the invention. However, in general, it is preferred that between 2 and 10 (e.g. 2, 3, 4, 5, 6, 7, 8, 9, or 10 layers) discontinuous paint layers are employed. When multiple discontinuous paint layers are employed, each layer can have the same pattern or a different pattern. In a preferred embodiment, each discontinuous paint layer has a different pattern. Additionally or alternatively, each discontinuous paint layer can comprise the same paint or a different paint. In a preferred embodiment, each discontinuous paint layer comprises a different paint. Each discontinuous paint layer can be transparent, translucent or opaque depending on the desired visual properties of the stone effect coating.

Numerous kinds of paint can be used for the continuous base layer or the discontinuous paint layer(s). Suitable paint chemistries include, without limitation, polyester, acrylic, silicon modified polyester, silicon polyester, and/or fluorocarbon paints (e.g., Polyvinylidene fluoride (PVDF) and/or Fluoroethylene Vinyl Ether (FEVE)).

Suitable paints include, without limitation, Ceram-a-Star 1050™ (AzkoNobel Coatings, Columbus, Ohio), VARI-Cool™ and ULTRA-Cool™ (PPG Industries, Pittsburgh, Pa.).

It is often desirable that the stone-effect coatings of the invention are able to reflect infrared radiation. Accordingly, in certain embodiments, the continuous base layer or the discontinuous paint layer(s) comprise paint pigments capable of reflect infrared radiation containing (e.g., titanium dioxide and ceramic particles).

In certain embodiments, one or more discontinuous paint layers comprise a color-flip paint. The use of color-flip paints allows the stone-effect coatings of the invention to mimic natural or man-made stone that contains minerals exhibiting different colors at different viewing angles. Suitable color-flip paints include, without limitation, polychromatic paints (e.g., Vari-Cool™, PPG Industries, Pittsburgh, Pa.) and mica-containing paints. In the case of mica-containing paints, the mica can be particles or flakes of any size and can be naturally occurring and/or man-made. In a particular embodiment, the color-flip paint is a clear coat comprising mica particles.

The skilled artisan will appreciate that if a substrate is chosen that naturally has a surface exhibiting a specular reflection between about 6 and 120 gloss units (e.g., about, 6, 7, 8, 9, 10, 12, 13, 14, 15, 20, 25, 30, 35, 40, 45, 50, 55, 60, 65, 70, 75, 80, 85, 90, 95, 100, 105, 100, 115, or 120 gloss units), then there is no need to apply a base layer to this substrate prior to the application of the discontinuous paint layer(s). Accordingly, the invention also encompasses an article comprising a substrate having a specular reflection of between about 6 and 120 gloss units (e.g., about, 6, 7, 8, 9, 10, 12, 13, 14, 15, 20, 25, 30, 35, 40, 45, 50, 55, 60, 65, 70, 75, 80, 85, 90, 95, 100, 105, 100, 115, or 120 gloss nits), beneath at least one discontinuous paint layer having a stone-effect pattern, wherein the coating has the appearance of polished stone.

The continuous base layer or the discontinuous paint layer(s) can be of any thickness necessary to produce the desired optical result. In general, a base layer paint coat is about 0.7 to about 0.8 mils thick, and a discontinuous paint layer is about 0.20 to about 0.90 mils thick. In certain embodiments, the film thickness of the discontinuous paint layer(s) has a non-uniform thickness to give the illusion of color variation due to relative transparency/opacity differences.

The stone-effect coatings present on the articles of the invention can mimic any natural or man-made polished stone. In general, the stone-effect coatings of the invention are particularly suitable for mimicking stone that contains mineral inclusions exhibiting different colors at different viewing angles pattern. Suitable stones include, without limitation, granites and marbles.

IV. Methods of Manufacture

In another aspect, the invention provides methods of making an article (e.g., metal strip) having the appearance of polished stone. The methods of the invention generally comprise: applying a continuous paint base layer having a specular reflection of about 6 to about 120 gloss units (e.g., about, 6, 7, 8, 9, 10, 12, 13, 14, 15, 20, 25, 30, 35, 40, 45, 50, 55, 60, 65, 70, 75, 80, 85, 90, 95, 100, 105, 100, 115, or 120 gloss units) to a substrate (e.g, metal strip); and applying onto the base layer at least one discontinuous paint layer in a stone-effect pattern. The methods of the invention can utilize any of the substrates and paints disclosed herein.

The continuous base layer or the discontinuous paint layer(s) can be applied in any thickness necessary to produce the desired optical result. In general, a base layer paint coat is applied at a thickness of about 0.7 to about 0.8 mils, and a discontinuous paint layer is applied at a thickness of about 0.20 to about 0.90 mils. In certain embodiments, the discontinuous paint layer(s) is applied at a non-uniform thickness to give the illusion of color variation due to relative transparency/opacity differences.

The continuous paint base layer and/or discontinuous paint layer(s) can be applied to the substrate using any techniques known in the art including, without limitation, rotogravure and flexographic printing techniques. In a preferred embodiment, the continuous paint base layer and/or discontinuous paint layer(s) are applied to the substrate (e.g., a strip metal coil) using flexographic printing.

IV. Uses of Articles of the Invention

The articles of the invention are particularly useful for the fabrication of construction materials. In certain embodiments, the articles of the invention are metal strips (e.g, coils or sheets). Such metal strips can be cold formed into light-weight construction materials including, without limitation, exterior building cladding and roofing. For example, most metal buildings are constructed about a metal frame. Thus, an additional step, in embodiments, would include the metal strip (having the desired stone-effect coatings applied) being installed onto building support structures, e.g., metal purlins or gifts, as wall or roofing materials. In most cases, the strip will enclose a part of the building structure, and will be used along with other similar strips and other roof and wall structures to substantially enclose the overall structure.

V. Exemplification

The present invention is further illustrated by the following examples which are included merely for purposes of illustration of certain aspects and embodiments of the present invention, and are not intended to limit the invention.

Example 1

A steel coil having a coating with a surface with the appearance of red granite is generated by flexographic printing. A uniform base coat of Pearl Grey Ceram-a-Star 1050™ paint (manufacturer's code PA8J45179, AzkoNobel Coatings, Columbus, Ohio) is first applied to a pre-primed galvanized steel coil using a flexographic roller to achieve a 0.7 mils thick film with a specular reflection of 80 (at an angle of 60 degrees as measured by a glossmeter). A first discontinuous paint layer of Dark Red Ceram-a-Star 1050™ paint (manufacturer's code XR3Y46036, AzkoNobel Coatings, Columbus, Ohio) is applied onto the base coat in a stone-effect pattern using a flexographic roller to achieve a paint film with a specular reflection 30 (at an angle of 60 degrees as measured by a glossmeter). A second discontinuous paint layer of Country Red Ceram-a-Star 1050™ paint (manufacturer's code XR3G43847, AzkoNobel Coatings, Columbus, Ohio) is applied onto the base coat in a stone-effect pattern using a flexographic roller to achieve a paint film with a specular reflection 30 (at an angle of 60 degrees as measured by a glossmeter). The first and second discontinuous paint layers are applied have a non-uniform film thickness of between 0.20-0.90 mils.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. A metal strip having coatings on at least one surface of the strip, the coatings comprising a continuous paint base layer with a specular reflection between about 6 and 120 gloss units beneath at least one discontinuous paint layer having a stone-effect pattern, wherein the coatings have the appearance of a polished stone surface.

2. The metal strip of claim 1, wherein the continuous paint base layer has a specular reflection of between about 60 and 90 gloss units.

3. The metal strip of claim 1, wherein the continuous paint base layer has a specular reflection of between about 80 and 90 gloss units.

4. The metal strip of claim 1, wherein the continuous paint base layer comprises pigmented paint and is devoid of clear coat.

5. The metal strip of claim 1, wherein the continuous paint base layer comprises a separately applied pigmented paint layer beneath the clear coat layer.

6. The metal strip of claim 1, wherein the continuous paint base layer is opaque.

7. The rental strip of claim 1, comprising 2 to 10 separately applied discontinuous paint layers.

8. The metal strip of claim 7 wherein at least 2 of the discontinuous paint layers have a different stone-effect pattern.

9. The metal strip of claim 7, wherein at least 2 of the discontinuous paint layers comprise a different paint.

10. The metal strip of claim 1, comprising at least one discontinuous paint layer comprising a pigmented paint.

11. The metal strip of claim 1, comprising at least one discontinuous paint layer comprising a color-flip paint.

12. The metal strip of claim 11, wherein the color-flip paint is a polychromatic paint.

13. The metal strip of claim 11, wherein the colon-flip paint contains mica particles.

14. The metal strip of claim 1, comprising at least one discontinuous paint layer that is opaque.

15. The metal strip of claim 1, comprising at least one discontinuous clear coat paint layer with mica particles introduced therein.

16. The metal strip of claim 1, comprising at least one discontinuous paint layer with a specular reflection between about 6 and 120 gloss units.

17. The metal strip of claim 1, comprising at least one discontinuous paint layer with a specular reflection between about 6 and 15 gloss units.

18. The metal strip of claim 1, comprising at least one discontinuous paint layer with a specular reflection between about 8 and 10 gloss units.

19. The metal strip of claim 1, wherein the continuous paint base layer and/or the at least one discontinuous paint layer comprises a polyester, acrylic, silicon modified polyester, silicon polyester, or fluorocarbon paint.

20. The metal strip of claim 19, wherein the fluorocarbon paint comprises PVDF and/or FETE.

21. The metal strip of claim 1, wherein the at least one discontinuous paint layer contains at least one of: 1) a ceramic pigment, or 2) titanium dioxide.

22. The metal strip of claim 1, wherein the coating has the appearance of polished granite.

23. The metal strip of claim 1, wherein the metal strip is steel, metallic coated steel, or aluminum.

24. The metal strip of claim 1, wherein the obverse face of the metal strip is coated with an aluminum, zinc, and silicon containing alloy.

25. The metal strip of claim 24, wherein the alloy comprises between about 45 to about 60% aluminum, between about 37 to about 46% zinc and between about 1.2 to about 2.3% silicon, by weight.

26. The metal strip of claim 1, wherein the metal strip is a coil.

27. The metal strip of claim 1, wherein the metal strip is cold formed into an article.

28. A method of producing a metal strip having the appearance of polished stone, the method comprising:
   applying a continuous paint base layer having a specular reflection of about 6 to about 120 gloss units to the metal strip; and
   applying onto the base layer at least one discontinuous paint layer in a stone-effect pattern.

29. A method of making a decorative surface for an article, the method comprising:
   depositing a continuous paint base layer onto a metal strip, the paint base layer having a specular reflection between about 6 and 120 gloss units;
   depositing at least one discontinuous paint layer atop the continuous paint base layer, the discontinuous paint layer having a stone-effect pattern; and
   installing the decorative surface onto an article.

30. The method of claim 29, wherein the installing step further comprises fixing the strip onto one of a purlin and a girt to at least partially enclose the building structure.

* * * * *